(12) United States Patent
Grimes

(10) Patent No.: US 6,476,348 B1
(45) Date of Patent: Nov. 5, 2002

(54) LASER CUTTING SYSTEM WITH A SHEET LOADING DEVICE

(75) Inventor: Richard A. Grimes, Forest, VA (US)

(73) Assignee: Diebold, Incorporated, North Canton, OH (US)

( * ) Notice: Subject to any disclaimer, the term of this patent is extended or adjusted under 35 U.S.C. 154(b) by 56 days.

(21) Appl. No.: 09/801,245

(22) Filed: Mar. 7, 2001

Related U.S. Application Data

(60) Provisional application No. 60/188,503, filed on Mar. 10, 2000.

(51) Int. Cl.[7] .............................................. B23K 26/42
(52) U.S. Cl. .............................. 219/121.67; 219/121.82
(58) Field of Search ......................... 219/121.82, 121.6, 219/121.67

(56) References Cited

U.S. PATENT DOCUMENTS 4,412,120 A  * 10/1983  Duruz et al.
4,672,172 A  *  6/1987  Pearl
4,675,497 A  *  6/1987  Pearl et al.
6,046,428 A  *  4/2000  Serruys .................. 219/121.82

FOREIGN PATENT DOCUMENTS

JP          5-277790 A  * 10/1993  ............... 219/121.6

* cited by examiner

Primary Examiner—Geoffrey S. Evans
(74) Attorney, Agent, or Firm—Daniel D. Wasil; Ralph E. Jocke; Walker & Jocke

(57) ABSTRACT

A laser cutting system including a laser cutting device, a sheet supporting and positioning grid, sheet loading members, and an intermediate sheet transfer device. A laser device is able to cut a metal sheet while the sheet is supported by a grid. The grid is movable on a laser cutting table. The sheet loading members comprise movable members able to support a metal sheet during loading of the sheet onto the grid. The movable members are enabled to pass through the grid to receive and support a sheet. An intermediate sheet transfer device is positioned outside of the grid and intermediate a sheet delivery cart and the grid. The intermediate sheet transfer device enables an easier transfer of a metal sheet from a sheet delivery cart onto the movable members. The intermediate transfer device may also include movable members. The movable members may include rotatable balls.

16 Claims, 4 Drawing Sheets

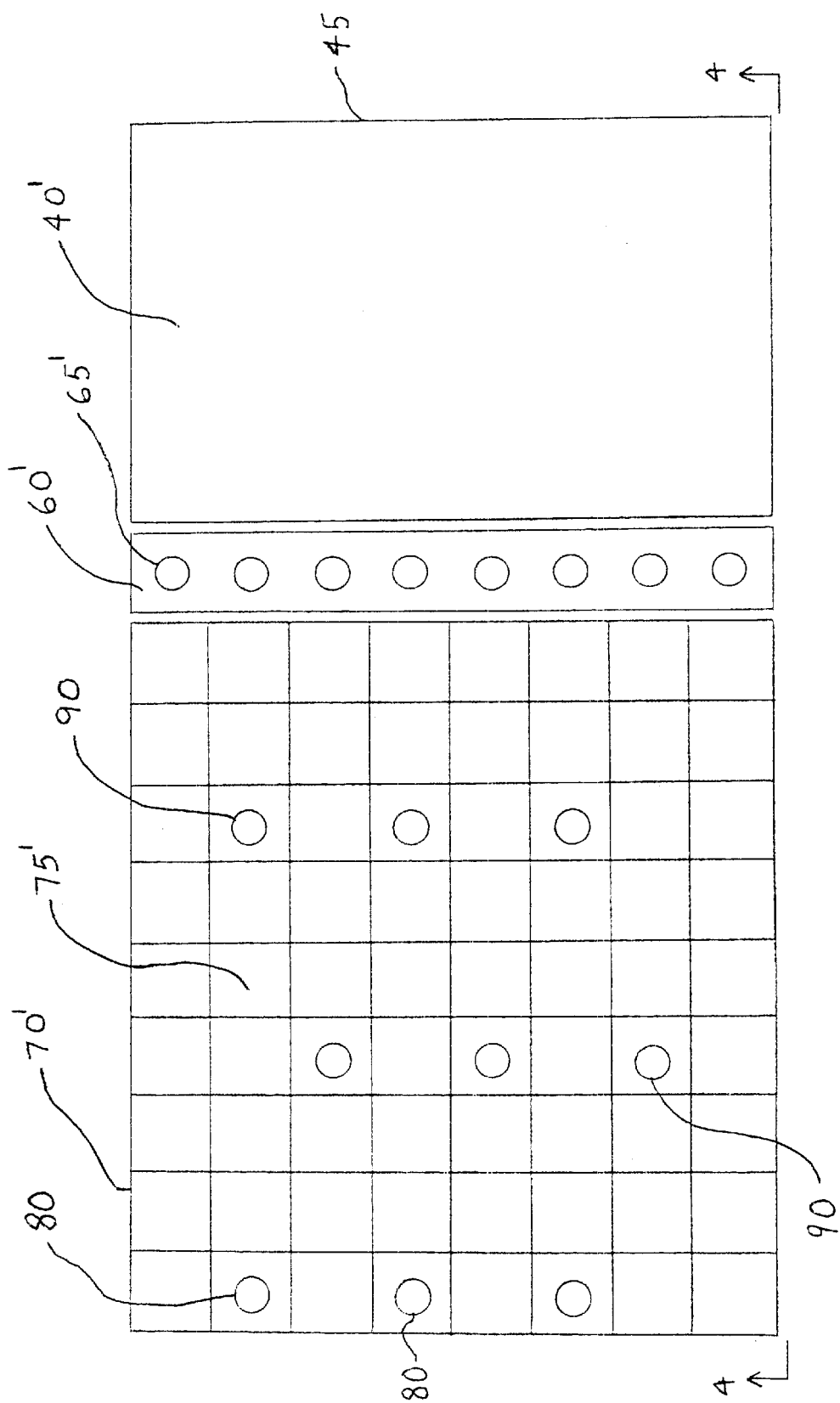

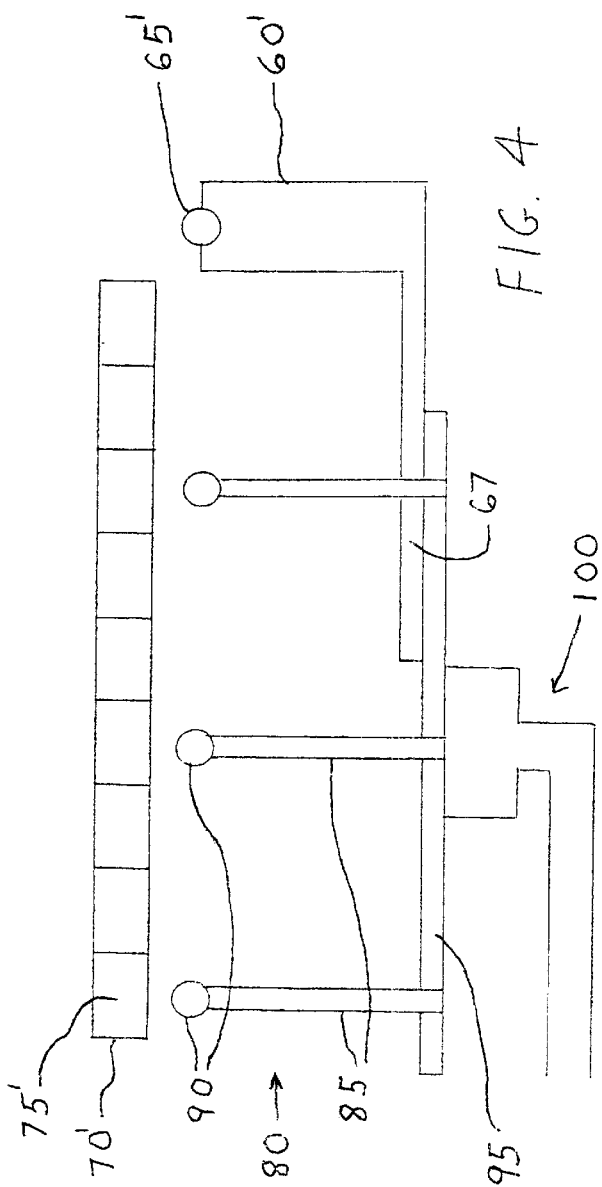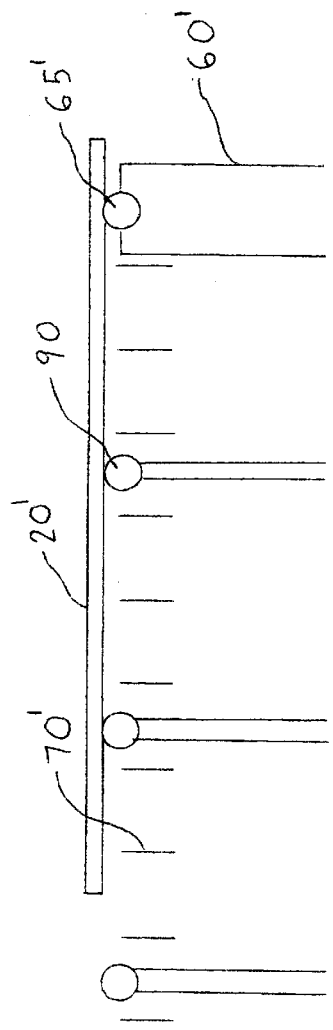

LASER CUTTING SYSTEM WITH A SHEET LOADING DEVICE

This application claims benefit of No. 60/188,503 filed Mar. 10, 2000.

TECHNICAL FIELD

This invention relates to a laser cutting system. More specifically this invention relates to a laser cutting system enabling the laser cutting of a metal sheet.

BACKGROUND ART

Laser cutting systems are widely used for cutting metal sheets. Typically a laser is positioned above a laser cutting table. A metal sheet is delivered to the vicinity of the cutting table by a sheet delivering cart. The sheet is then manually lifted onto the cutting table. The sheet is moved on the table to a desired cutting position. Once properly positioned, the sheet may be cut using the laser.

However, the metal sheets are sometimes very heavy. Because of nearby equipment there may be relatively large distances between the cart and the cutting table. A sheet has to be manually transferred across this large distance during the loading of a sheet onto the cutting table. Therefore, the initial lifting and positioning of a sheet onto the laser cutting table can be cumbersome and difficult. Additionally, the mishandling of a sheet over the required distance may result in damage to the sheet or a component of the laser cutting system.

Thus, there exists a need for the transfer of a metal sheet from a sheet delivering cart to a laser cutting table in an easier and safer manner.

DISCLOSURE OF INVENTION

It is an object of an exemplary form of the present invention to provide a laser cutting system that permits the cutting of a metal sheet.

It is a further object of an exemplary form of the present invention to provide a laser cutting system that permits the cutting of a metal sheet on a laser cutting table having a sheet supporting grid.

It is a further object of an exemplary form of the present invention to provide a laser cutting system that enhances the positioning of a metal sheet on a sheet supporting grid.

It is a further object of an exemplary form of the present invention to provide a laser cutting system that provides a plurality of adjacent movable members to enhance the positioning of a metal sheet on a sheet supporting grid.

It is a further object of an exemplary form of the present invention to provide a laser cutting system that enhances the loading of a metal sheet onto a sheet supporting grid.

It is a further object of an exemplary form of the present invention to provide a laser cutting system that provides a plurality of adjacent movable members located outside of the sheet supporting grid to enhance the loading of a metal sheet onto the sheet supporting grid.

It is a further object of an exemplary form of the present invention to provide a laser cutting system that provides a ball handling device for simultaneously moving rotatable balls between a sheet supporting position and a non-supporting position to enhance the positioning of a metal sheet on a sheet supporting grid.

It is a further object of an exemplary form of the present invention to provide a laser cutting system that provides for the transfer of a metal sheet from a sheet delivering cart to a laser cutting table in an easier and safer manner.

Further objects of exemplary forms of the present invention will be made apparent in the following Best Mode For Carrying Out Invention and the appended claims.

BRIEF DESCRIPTION OF DRAWINGS

FIG. 3 is a top plan view showing the arrangement of sheet loading members, a sheet positioning device, an intermediate sheet transfer device, and a sheet supporting table in an exemplary embodiment of the present invention.

FIG. 4 is a side view of FIG. 3 taken along 4—4 and showing the sheet loading members in a lowered position.

FIG. 5 is a view similar to FIG. 4 except the sheet loading members are in a raised position.

BEST MODE FOR CARRYING OUT INVENTION

Figure 1:
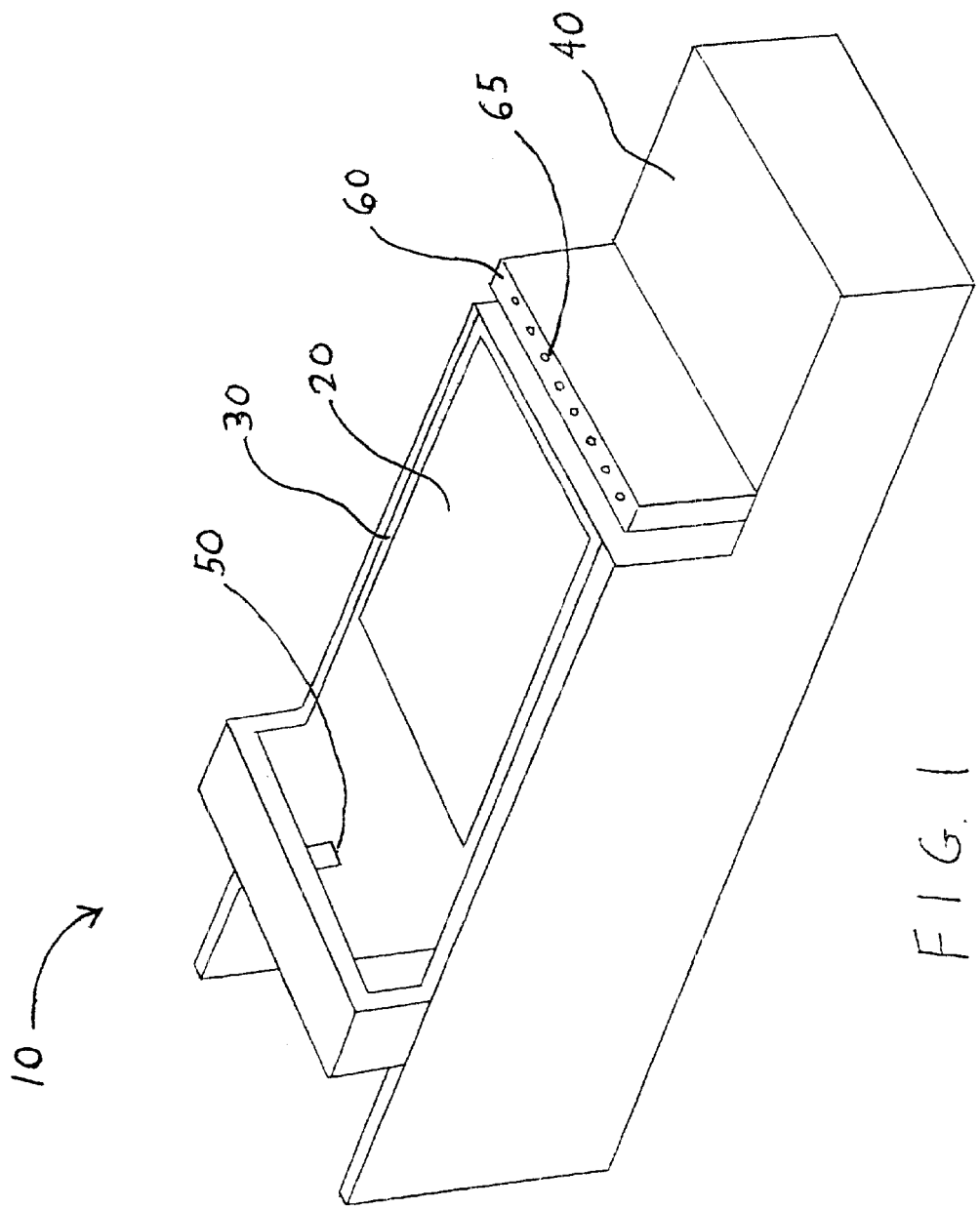
FIG. 1 is an isometric view of the laser cutting system of an exemplary embodiment of the present invention.

Although the following description is directed to a laser cutting system for a metal sheet, the laser cutting system is not limited to use with metal sheets, but is also applicable to any material capable of being cut by a laser. An exemplary embodiment of the invention is shown in FIG. 1. The laser cutting system 10 of the present invention includes devices for the supporting, handling, and cutting of a metal sheet 20. One or more sheets 20 may be delivered to the cutting system 10 by a sheet delivering device, such as a cart. Some sheets may be hand carried to the cutting system 10. Sheets 20 delivered to the cutting system 10 maybe placed directly onto a laser cutting table 30 or temporarily placed onto a sheet supporting table 40. The sheet supporting table 40 may include a controllable lift mechanism such that the upper surface thereof may be raised to the level of the cutting table 30.

The laser cutting system 10 also includes a laser cutting device 50. Laser cutting devices are known. The laser cutting device 50 is shown vertically elevated relative to the sheet 20. However, it should be understood that the position of the laser shown is exemplary and that other embodiments of the invention may include other laser positions. For example, based on the desired type of cut, a laser may be positioned at an angle to the sheet or even below the sheet. Additionally, more than one laser cutting device may be used.

The laser cutting system 10 also includes an intermediate sheet transfer device 60. The intermediate sheet transfer device 60 enables the transfer of a metal sheet 20 from a sheet delivery cart onto the laser cutting table 30 in a manner that is less strenuous and which reduces risk of injury. The sheet transfer device 60 is positioned intermediate a sheet delivery cart and the laser cutting table 30. As shown in FIG. 1, the intermediate sheet transfer device 60 is also positioned intermediate the sheet supporting table 40 and the laser cutting table 30. The intermediate sheet transfer device 60 may include members 65 which enable a sheet to slide over the intermediate sheet transfer device 60 during the lifting of a sheet onto the laser cutting table 30. The members may comprise movable members, such as rotatable ball members 65. The ball members 65 may use bearings which permit the ball members to rotate in any direction.

Figure 2:
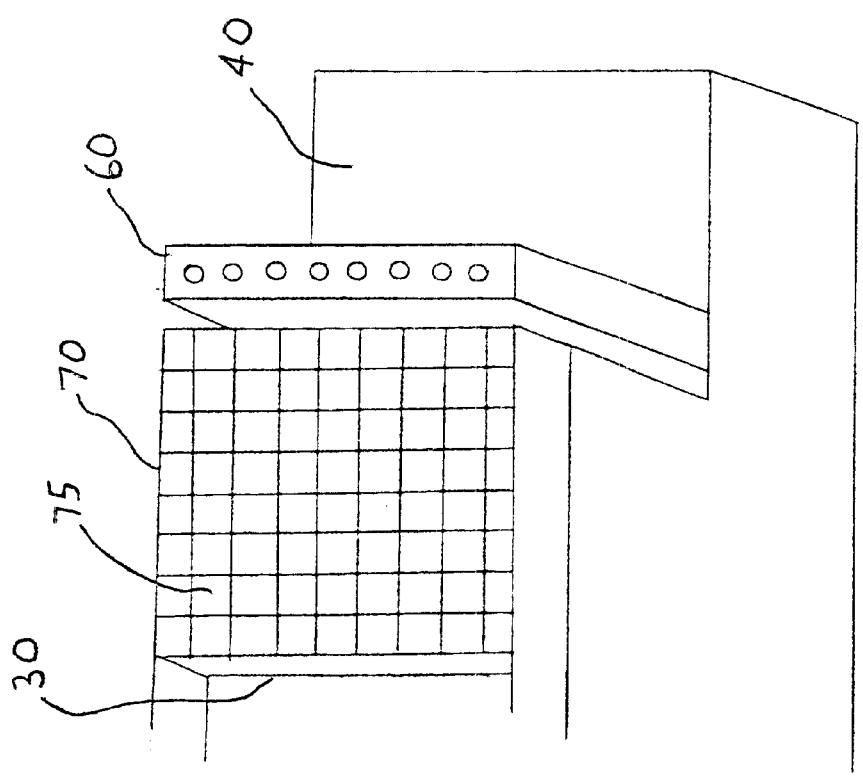
FIG. 2 is a cut away isometric view of the laser cutting system of FIG. 1.

FIG. 2 shows a cutting table 30 including a sheet positioning device 70, such as a removable grid or pallet arrangement. The grid or pallet arrangement may be integral and may be metal. A sheet may be accurately positioned on the grid arrangement 70 for proper alignment during the cutting process. The grid 70 may comprise an arrangement of intersecting rows and columns, such as a honeycomb type or egg crate type of arrangement. The grid arrangement 70 comprises grid cells 75. During a cutting process, a grid 70, carrying a sheet 20, may be moved adjacent to a laser cutting device 50 for the laser cutting of the sheet 20.

FIG. 3 shows the arrangement of sheet loading members 80 arranged adjacent to a grid 70'. The grid 70' is adjacent to an intermediate sheet transfer device 60' and a sheet supporting table 40'. The sheet loading devices 80 enable a sheet to slide over the grid 70' during the loading of a sheet onto the grid. The sheet loading members 80 also enable the sheet to be accurately positioned relative to the grid.

FIG. 4 shows that the sheet loading members 80 may comprise support segments 85 and movable members 90. The movable members may permit the smooth loading of a sheet relative to the grid without snagging or damage to the sheet, such as rotatable ball members 90. Each ball member 90 is in vertical alignment with a respective grid cell 75' and is sized for passage generally along the vertical direction through the respective grid cell. The movable members may be arranged on the support segments, such as support rods 85. Support bracing 95 may be used to hold the sheet loading members 80 in a desired alignment. The sheet loading members 80 may be supported by the bracing 95 as one or more units. It should be understood that the bracing of the sheet loading members 80 shown is exemplary and that other embodiments of the invention may include the sheet loading members 80 not supported in a unit, but individually supported.

As shown in FIG. 4 the sheet loading members 80 are capable of being raised and lowered relative to the grid 70'. A moving system 100 may be used for the raising and lowering of the sheet loading members 80. The moving system 100 may comprise known devices, such as hydraulic, pneumatic, mechanical, electrical, or electro mechanical devices, for use in raising and lowering the sheet loading members 80.

The intermediate sheet transfer device 60' may comprise movable members 65'. The movable members may comprise rotatable ball members 65'. The rotatable ball members 65, 65', 90 described herein may be of the same or similar type of ball member. FIG. 4 shows ball members 65' and 90 in a sheet non-engaging or non-supporting position. In this position each of the ball members 65' and 90 are positioned below the top of the grid 70'.

As shown in FIG. 4, the intermediate sheet transfer device 60', along with rotatable ball members 65', may be operatively connected, such as by bracing 67, with the sheet loading members 80. The bracing 67 may be connected to the support bracing 95. The connections may comprise known types of connections or fastenings, such as mechanical, welding, etc. Therefore, the intermediate sheet transfer device 60' may be simultaneously raised and lowered along with the sheet loading members 80. It should be understood that the shown connection of the intermediate sheet transfer device 60' to the sheet loading devices 80 is exemplary and that other embodiments of the invention may include other connection arrangements. For example, instead of the shown connection having the bracing 67 located above the support bracing 95, the bracing 67 may be located next to or below the support bracing 95. Additionally, it should also be understood that the shown arrangement of the moving system is exemplary and that other embodiments of the invention may include other moving system arrangements. For example, the intermediate sheet transfer device 60' may have its own separate moving system and/or each of the sheet loading devices 80 may be connected to their own separate moving systems. Hence, the use of separate moving systems would permit, if desired, the employment of only a portion of the sheet loading devices 80 during the loading of a sheet.

FIG. 5 shows a sheet 20' being loaded. The ball members 65' and 90 are in a sheet engaging position. In this position at least a portion of each raised ball member 65' and 90 is located above the grid 70'. During the raising and lowering, the intermediate sheet transfer device 60' remains outside of the boundaries of the grid 70'. Hence, the ball members 65' do not enter the grid 70'.

During the loading of a sheet onto the grid 70', the ball members 65' and 90 are raised to their sheet supporting position to permit sliding of the sheet on the ball members. After the sheet is moved to its aligned position relative to the grid, then the ball members 65' and 90 are lowered and the sheet becomes engaged with and supported by the grid 70'. The sheet is then ready to be moved towards the laser cutting device to be cut. It should also be understood that the shown operation of the laser cutting is exemplary and that other embodiments of the invention may include other laser cutting operations. For example, the laser cutting device may be arranged to move toward a sheet, and/or the grid may be stationary.

As can be seen in FIG. 3, the ball members 90 closest to the sheet supporting table 40' are at a large distance from the front edge 45 of the table 40'. In the exemplary embodiment shown, this front edge 45 is the closest a sheet delivery cart may approach the cutting table, which supports a grid 70'. A sheet may be manually lifted by a person standing to the side of the table 40'. Without the arrangement of the intermediate sheet transfer device 60', a sheet may have to be lifted from a cart and placed directly onto the ball members 90. Hence, a heavy sheet would have to be lifted the indicated distance before it is capable of engaging the ball members 90 closest to the table 40'. The repetitive manual lifting of heavy sheets over this large distance may be too difficult for certain individuals. Furthermore, the character of certain sheets may be such that individuals may not be able to lift and/or maintain an undamaged condition for a single sheet the required distance. Additionally, the mishandling of a sheet over the indicated distance may result in damage to the sheet, the grid 70', the sheet supporting table 40', and/or the cutting table.

The present invention provides a reduction in the distance a sheet has to be lifted prior to engagement with the ball members 90. The arrangement of the intermediate sheet transfer device 60' helps provide for this reduction. The rotatable ball members 65' of the intermediate sheet transfer device 60' may be strategically positioned outside of the grid 70' to provide support to a sheet prior to the sheet engaging the nearest ball members 90. By providing this additional and earlier support to a sheet, the rotatable ball members 65' help prevent the sheet from sliding against the grid 70' or the walls of the cutting table during the loading of the sheet onto the grid.

Thus, damage to the sheet, the grid, and the cutting table is reduced. Furthermore, the rotatable ball members 65' permit a sheet to be accurately aligned with the nearest ball members 90, and thus the grid, prior to initial engagement of the sheet with the nearest ball members 90. Thus, the time needed to accurately position the sheet on the grid is also reduced.

The intermediate sheet transfer device 60' acts as an extension of the sheet loading devices 80, but without the burden of having to be aligned with the grid cells 75'.

The present invention provides a novel laser cutting system that improves the transfer of a metal sheet onto the laser cutting system. The present invention also provides a novel laser cutting system that simplifies the lifting and transfer of a metal sheet onto the laser cutting system. The present invention also provides a novel laser cutting system. that improves the positioning of a metal sheet into a proper position on the laser cutting system.

Thus the exemplary form of the new laser cutting system of the present invention achieves at least one of the above stated objectives, eliminates difficulties encountered in the use of prior devices and systems, solves problems, and attains the desirable results described herein.

In the foregoing description certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means capable of performing the recited function, and shall not be limited to the structures shown herein or mere equivalents.

Having described the features, discoveries, and principles of the invention, the manner in which it is constructed and operated, and the advantages and useful results attained, the new and useful structures, devices, elements, arrangements, parts, combinations, systems, equipment, operations and relationships are set forth in the appended claims.

I claim:

1. A laser cutting system comprising:
   a laser cutting device;
   an integral grid arrangement, wherein the grid arrangement comprises a plurality of grid cells, and wherein the grid arrangement is adapted to support a sheet;
   sheet loading devices, wherein the sheet loading devices comprise respective first movable members,
      wherein each of the first movable members are in vertical alignment with a respective grid cell and are sized to pass through the respective grid cell, wherein each of the first movable members are adapted to move between a sheet supporting position and a non-supporting position, and wherein first movable members pass at least partially through a respective grid cell during the movement;
   an intermediate sheet transfer device, wherein the intermediate sheet transfer device is arranged transversely adjacent to the grid arrangement, wherein the intermediate sheet transfer device comprises second movable members,
      wherein each of the second movable members are adapted to move between a sheet supporting position and a non-supporting position, and wherein each of the second movable members remain outside of a grid cell during the movement.

2. The system of claim 1 wherein the intermediate sheet transfer device is operatively connected to the sheet loading devices.

3. The system of claim 1 further comprising a moving system, wherein the moving system is adapted to simultaneously move the first and second movable members between a non-supporting position and a sheet supporting position.

4. The system of claim 3 wherein the moving system is adapted to simultaneously move the intermediate sheet transfer device and the sheet loading devices.

5. The system of claim 1 wherein each of the second movable members comprises a rotatable ball.

6. The system of claim 3 wherein each of the first movable members comprises a rotatable ball.

7. The system of claim 6 wherein when the first movable members are moved from the non-supporting position to the supporting position the rotatable balls of the first movable members pass through a respective grid cell.

8. The system of claim 1 further comprising a sheet supporting table, wherein the intermediate sheet transfer device is positioned intermediate the grid arrangement and the sheet supporting table.

9. The system of claim 1 wherein the sheet loading devices are connected to move as a unit.

10. The system of claim 1 wherein at least a portion of each first movable member is positioned vertically above the grid while in the sheet supporting position.

11. A laser cutting system comprising:
    a laser cutting apparatus;
    a sheet supporting grid having plural grid cells;
    a plurality of adjacent sheet transfer balls, wherein the plurality of balls includes a first portion of balls and a second portion of balls, and wherein a sheet is supportable on the plurality of balls,
    wherein each ball in the first portion is in vertical alignment with a respective grid cell and is sized for passage through the respective grid cell,
    a ball handling device operatively connected to the plurality of balls,
    wherein the ball handling device is adapted to simultaneously move the plurality of balls between a sheet supporting position and a non-supporting position;
    wherein when the plurality of balls are simultaneously moved from the non-supporting position to the supporting position only the first portion of balls passes through the grid.

12. The system of claim 11 wherein the ball handling device supports the balls.

13. The system of claim 12 wherein the grid has an upper surface, and wherein the sheet supporting position is located above the upper surface.

14. The system of claim 13 wherein the ball handling device is adapted to move the balls above the grid to the sheet supporting position.

15. The system of claim 14 wherein the second portion of balls are operatively connected to an intermediate sheet transfer device, wherein the intermediate sheet transfer device is arranged transversely adjacent to the grid.

16. The system of claim 15 wherein the intermediate sheet transfer device is connected to the ball handling device.

* * * * *